(12) United States Patent
Ziegler et al.

(10) Patent No.: US 8,000,434 B2
(45) Date of Patent: Aug. 16, 2011

(54) ENERGY SPECTRUM RECONSTRUCTION

(75) Inventors: Andy Ziegler, Hamburg (DE); Roland Proksa, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 112 days.

(21) Appl. No.: 12/373,112

(22) PCT Filed: Jul. 2, 2007

(86) PCT No.: PCT/US2007/072694
§ 371 (c)(1),
(2), (4) Date: Jan. 9, 2009

(87) PCT Pub. No.: WO2008/008663
PCT Pub. Date: Jan. 17, 2008

(65) Prior Publication Data
US 2009/0310736 A1      Dec. 17, 2009

Related U.S. Application Data

(60) Provisional application No. 60/806,794, filed on Jul. 10, 2006.

(51) Int. Cl.
*A61B 6/00* (2006.01)
(52) U.S. Cl. .................................. 378/5; 378/4
(58) Field of Classification Search .................... 378/4, 5
See application file for complete search history.

(56) References Cited

U.S. PATENT DOCUMENTS

| 5,943,388 | A | 8/1999 | Tumer | |
| 6,507,633 | B1 * | 1/2003 | Elbakri et al. | 378/8 |
| 6,522,718 | B2 | 2/2003 | Sato | |
| 2003/0156684 | A1 * | 8/2003 | Fessler | 378/210 |
| 2004/0096031 | A1 | 5/2004 | Caria et al. | |
| 2008/0095305 | A1 * | 4/2008 | Ziegler et al. | 378/8 |
| 2008/0205585 | A1 | 8/2008 | Proksa et al. | |
| 2009/0268862 | A1 * | 10/2009 | Ziegler | 378/5 |

FOREIGN PATENT DOCUMENTS

| WO | 2004037089 A1 | 5/2004 |
| WO | 2006109227 A2 | 10/2006 |
| WO | 2006117720 A2 | 11/2006 |

OTHER PUBLICATIONS

David L. Band, Burst Populations and Detector Sensitivity, Code 661, NASA, Dec. 15, 2003, pp. 1-4, Goddard Space Flight Center, Greenbelt, MD 20771, downloaded from XXX.lanl.gov/pdf/astro-ph/0312334 on Mar. 9, 2006.

(Continued)

*Primary Examiner* — Edward J Glick
*Assistant Examiner* — Alexander H Taningco

(57) ABSTRACT

A computed tomography system includes an x-ray source (108) that rotates about and emits radiation through an imaging region (116). At least one finite energy resolution detector (112) detects the emitted radiation. The at least one finite resolution detector (112) includes a plurality of sub-detectors (204). Each of the plurality of sub-detectors (204) is associated with one or more different energy thresholds. Each of the energy thresholds is used to count a number of incident photons based on a corresponding energy level. A reconstruction system (136) reconstructs the photon counts to generate one or more images of a subject residing within the imaging region (116).

19 Claims, 2 Drawing Sheets

OTHER PUBLICATIONS

Bolotnikov et al., Factors Limiting the Performance of CdZnTe Detectors, IEEE Transactions on Nuclear Science, Jun. 2005, pp. 589-598, vol. 52, No. 3, Brookhaven National Laboratory, Upton N.Y. 11793.

Browne, J. A., et al.; Developments with maximum-liklihood x-ray computed tomography: initial testing with real data; 1994; Applied Optics; 33(14)3010-3022.

De Man, B., et al.; An Iterative Maximum-Likelihood Polychromatic Algorithm for CT; 2001; IEEE Trans. on Medical Imaging; 20(10)999-1008.

Fessler, J. A., et al.; Maximum-likelihood dual-energy tomographic image reconstruction; 2002; Proc. SPIE-Image Processing; vol. 4684:38-49.

* cited by examiner

ENERGY SPECTRUM RECONSTRUCTION

CROSS REFERENCE TO RELATED APPLICATIONS

This application claims the benefit of U.S. provisional application Ser. No. 60/806,794 filed Jul. 10, 2006, which is incorporated herein by reference.

The present application relates to medical imaging systems. It finds particular application to computed tomography (CT) and, more particularly to energy spectrum reconstruction.

A simple computed tomography system may include an x-ray tube mounted on a rotatable gantry opposite one or more detectors. The x-ray tube emits radiation that traverses an imaging region between the x-ray tube and the one or more detectors. Subject matter of interest to be scanned is placed within the imaging region. The one or more detectors detect radiation that passes through the imaging region and subject matter therein. The detectors generate corresponding projection data indicative of the detected radiation. The projection data is used to reconstruct volumetric data thereof. The volumetric data can be used to generate one or more images (e.g., 3D, 4D, etc.) of a portion of the subject matter residing within the imaging region. The resulting images include pixels that typically are represented in terms of grey scale values corresponding to relative radiodensity. Such information reflects the attenuation characteristics of the scanned subject matter and generally shows structure such as anatomical structures within a human or animal patient, physical structures within an inanimate object, and the like.

By capturing and leveraging spectral characteristics of the radiation, the resulting data can be enhanced to provide further information. For example, spectral information can be used to capture metabolic information such as how an organ is performing or to identify tissue. Cadmium Zinc Telluride (CZT) based as well as other detectors can capture spectral information, for example, through concurrently counting photons and measuring the energy thereof. However, a CZT based detector element of about the same size (e.g., 1.14 mm×1.41 mm) as a conventional Gadolinium Oxysulphide (GOS) detector element generally is poorly suited for CT applications since such detector typically is unable to count the relatively large number of photons associated with the traditionally used level of photon flux. The photon flux can be reduced to a level at which the CZT detector and/or corresponding electronics can count the photons; however reducing the photon flux as such can lead to a decrease in the signal-to-noise ratio (SNR), and it typically is desirable to at least maintain the SNR associated with traditional CT applications.

Present aspects of the application provide a new and improved reconstruction technique that addresses the above-referenced problems and others.

In accordance with one aspect, a computed tomography system includes an x-ray source, at least one finite energy resolution detector, and a reconstruction system. The x-ray source rotates about and emits radiation through an imaging region. The at least one finite resolution detector detects the emitted radiation. The at least one finite energy resolution detector includes a plurality of sub-detectors. Each of the plurality of sub-detectors is associated with one or more different energy thresholds. Each of the energy thresholds is used to count a number of incident photons based on the threshold energy level. A reconstruction system reconstructs the counts to generate one or more images of a subject residing within the imaging region.

According to another aspect, a CT reconstruction method includes detecting radiation traversing an imaging region, counting a number of incident photons for each of a plurality of different energy thresholds of a finite energy resolution sub-detector, and reconstructing an energy distribution of the photon counts.

According to another aspect, CT imaging system includes a means for emitting radiation through an imaging region and detecting emitted radiation that traverses the imaging region, a means for counting a number of incident photons for each of a plurality of different energy ranges of a finite energy resolution sub-detector, and a means for spectrally reconstructing the counts to generate one or more images.

The invention may take form in various components and arrangements of components, and in various steps and arrangements of steps. The drawings are only for purposes of illustrating the preferred embodiments and are not to be construed as limiting the invention.

Figure 1:
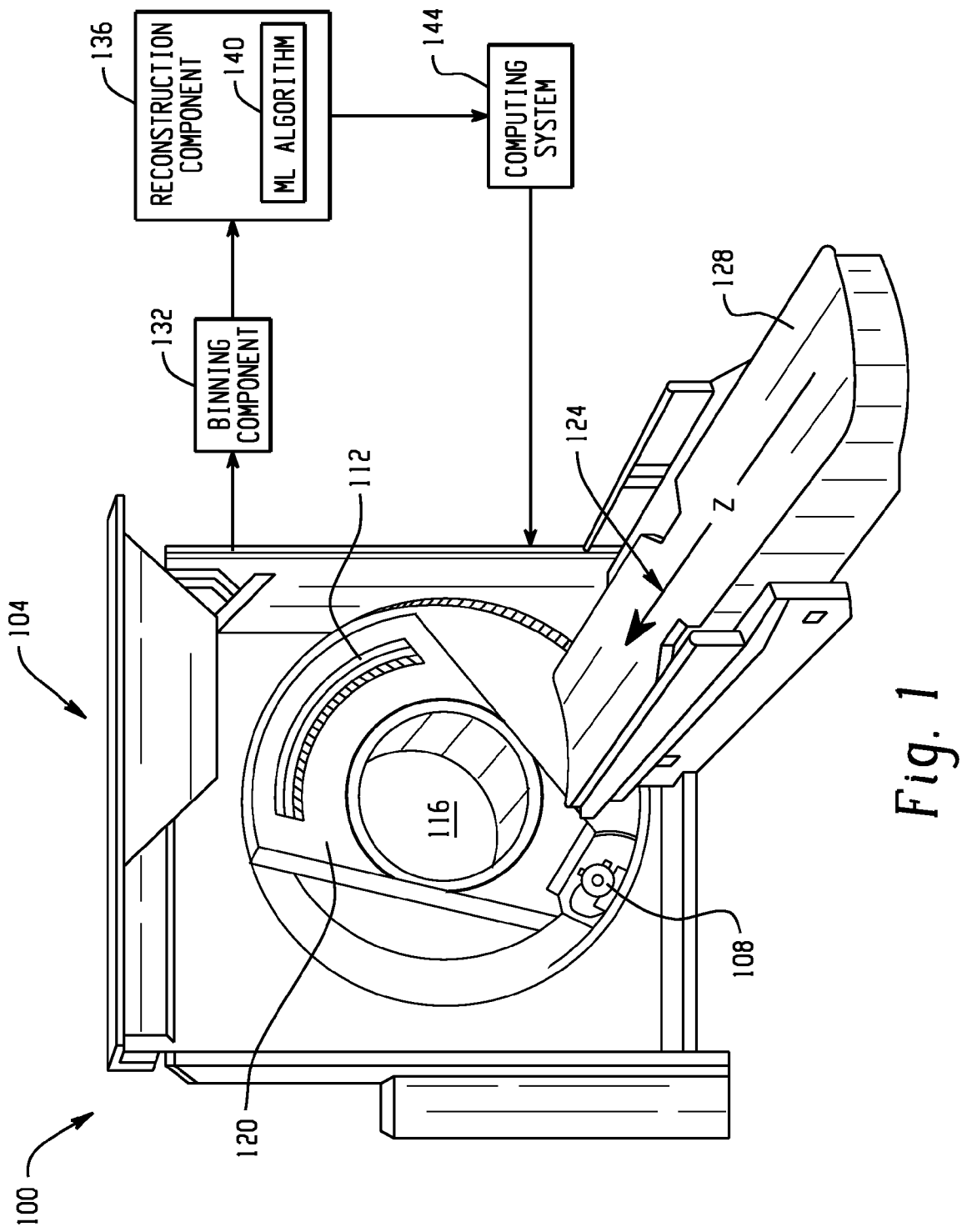
FIG. 1 illustrates an exemplary medical imaging system that employs an energy spectrum reconstruction to generate one or more images.

With reference to FIG. 1, a medical imaging system 100 is illustrated. The system 100 employs one or more finite energy resolution detectors that capture spectral information of incident radiation. In one instance, one or more of the detectors can include a plurality of sub-detectors (detector pixels), wherein each sub-detector is associated with a plurality of energy thresholds. Each of the energy thresholds for each sub-detector can be used to count a number of incident photons above (or below or between) the energy threshold level. A suitable detector is described in PCT20006/051285 filed on Apr. 25, 2006 and EP05103589.7 filed on Apr. 29, 2006, both of which are incorporated herein by reference. A spectral based reconstruction technique can be employed to reconstruct the distribution of photons and generate one or more images therefrom. In one instance, such reconstruction technique is based on a statistical or numerical approach. For example, the reconstruction technique can be a Maximum Likelihood reconstruction.

The medical imaging system 100 includes a scanner 104 with an x-ray source 108 and one or more detectors 112 ("detectors 112") that subtend an angular arc opposite the x-ray source 103. During scanning, the x-ray source 108 emits radiation through an imaging region 116, and the detectors 112 detect the radiation that traverses the imaging region 116 and strikes the detectors 112. In one instance, the x-ray source 108 is disposed about a rotating gantry 120 and rotates with the rotating gantry 120 around the imaging region 116. In another instance, the x-ray source 108 rotates around the imaging region 116 via other techniques such as electronically deflecting an e-beam. In yet another instance, the x-ray source 108 can be held at a stationary position. The detectors 112 may rotate with the x-ray source 108 (e.g., with a third generation system) or reside at fixed angular locations (e.g., with a fourth generation system). A support 124 supports a subject, such as a human, within the imaging region 140. The support 124 may be movable in order to guide the subject to a suitable location within the imaging region 116 before, during and/or after performing a helical, axial, and/or other scan, for example, by moving the support 124 along a z-axis 128 and/or one or more other axes. With non-medical applications, the support 124 may be a conveyor belt or other mechanism.

The detectors 112 can be associated with various detector technologies. In one instance, the detectors 112 are used to detect spectral information. In such instances, the detectors 112 can include Cadmium Zinc Telluride (CZT) or other material with spectral detection characteristics. Such detectors 112 can be used to selectively count incident photons, measure their energy, etc. In one instance, at least one of the detectors 112 includes a plurality of sub-detectors (or pixels or detector elements), wherein each of the sub-detectors counts photons, measures photon energy, etc. For example, the at least one detector 16 can include M×N (where M and N are integers) sub-detectors that each count photons and measure photon energy. By further example, the at least one detector 16 can be partitioned into a 10×10 or other size matrix of sub-detectors to form 100 sub-detectors that each count photons and measure photon energy. By using multiple sub-detectors, photon counting is spread across the detector 112. For example, with the 10×10 matrix of sub-detectors, the counting rate of each sub-detector is about one one-hundredth of that of a similarly dimensioned single detector element. This reduction in photon counting facilitates using CZT and like materials in connection with systems with photon fluxes traditionally used with GOS detector elements where relatively large number of photons is incident on the detectors.

Each of the sub-detectors 112 can be associated with one or more different energy thresholds. Each energy threshold can represent an energy crossing line in which incident photons with energy above the energy threshold are counted and associated with energies above the threshold, incident photons with energy below the crossing energy value are counted and associated with energies below the threshold, incident photons with energy above the energy threshold are counted and associated with energies above the threshold and incident photons with energy below the crossing energy value are counted and associated with energies below the threshold, or incident photons with energy between energy thresholds.

In instances in which only photons above or below the threshold are of interest, photons with energy below or above the threshold, respectively, can be ignored. By way of example, one of the sub-detectors may have an energy threshold of 20 KeV that counts the number of incident photons with energy greater than 20 KeV, an energy threshold of 30 KeV that counts the number of incident photons with energy greater than 30 KeV, an energy threshold of 40 KeV that counts the number of incident photons with energy greater than 40 KeV, etc. Additionally or alternatively, one of the sub-detectors may have energy thresholds of 20, 30 and 40 KeV that are used to count the number of incident photons with energy less than these thresholds. In one embodiment, at least one of the energy thresholds can be set to a level at which substantially all incident photons are counted. For instance, the threshold can be set to a floor level to count incident photons having energy above the floor threshold. The other thresholds can be variously set, including using different thresholds for the different sub-detectors and/or different thresholds for different detectors 116 to count photons for a plurality of energy ranges of interest.

A binning component 132 receives the count and energy information from the detectors 116 and bins the counts into one or more energy ranges or bins. For example, as described above using energy thresholds of 20 KeV, 30 KeV, and 40 KeV the number of photons above 20 KeV, 30 KeV, and 40 KeV can be counted. The binning component 132 can use this information to variously separate the counts across one or more energy bins based on energy. For example, the binning component 132 can use a subtraction or other technique to derive the number of counts for a bin with a range of 20-30 KeV, a bin with a range of 30-40 KeV, etc. For instance, the binning component 132 can subtract the number of counts above 30 KeV from the number of counts above 20 KeV to compute the number of counts in a bin corresponding to the energy range of 20-30 KeV, subtract the number of counts above 40 KeV from the number of counts above 30 KeV to compute the number of counts in a bin corresponding to the energy range of 30-40 KeV, etc.

A reconstruction component 136 processes the binned and/or unbinned data. In one instance, the reconstruction component 136 uses one or more statistical or numerical methods to process such data. For instance, the reconstruction component 136 can employ a Maximum Likelihood algorithm 140 or the like to process the data. The algorithm 140 (as described in detail below) can be used to reconstruct the spectral information to generate images of the scanned subject matter. In one instance, this can be achieved through inferences about parameters of the underlying probability distribution of energy distributions and/or other approaches.

The generated images can be displayed, filmed, archived, forwarded to a treating clinician (e.g., emailed, etc.), fused with images from other imaging modalities, further processed (e.g., via measurement and/or visualization utilities and/or a dedicated visualization system), stored, etc. A computing system (or console) 144 facilitates operator interaction with and/or control of the scanner 104. Software applications executed by the computing system 142 allow the operator to configure and/or control operation of the scanner 104. The computing system 142 also allows the user to view and/or manipulate the raw and/or reconstructed data and/or the images.

The spectral reconstruction technique described herein or variants thereof can be used to capture anatomical information like conventional projection reconstruction systems and, in addition, metabolic and/or other information. For example, the approach described herein can be used in connection with perfusion, functional, or molecular imaging. For instance, a procedure may utilize an agent with uptake characteristics designed with enhanced uptake by particular tissue. Such agent can be used to obtain information about that type of tissue. For example, the agent may be used to identify tissue, determine the presence of certain tissue, ascertain how particular tissue is functioning, etc. When administered to a subject, the agent primarily concentrates with such tissue after a period of time. Using conventional projection reconstruction, it may be difficult to discern the tissue of interest from surrounding different tissue. For example, it may be difficult to identify, locate, separate, etc. liver tumor cells with a high concentration of agent from liver cells. However, by capturing spectral information, the relatively higher concentration of agent in the liver cells can be leverage to enhance the liver tumor cells and suppress other tissue (e.g., the liver cells). In one instance, the resulting images generated from such data may represent the liver tumor cells as a "hot spot" similar to nuclear imaging techniques or the like. In another instance, the resulting images may have improved contrast resolution characteristics that facilitate differentiating tissue of similar contrast.

Figure 2:
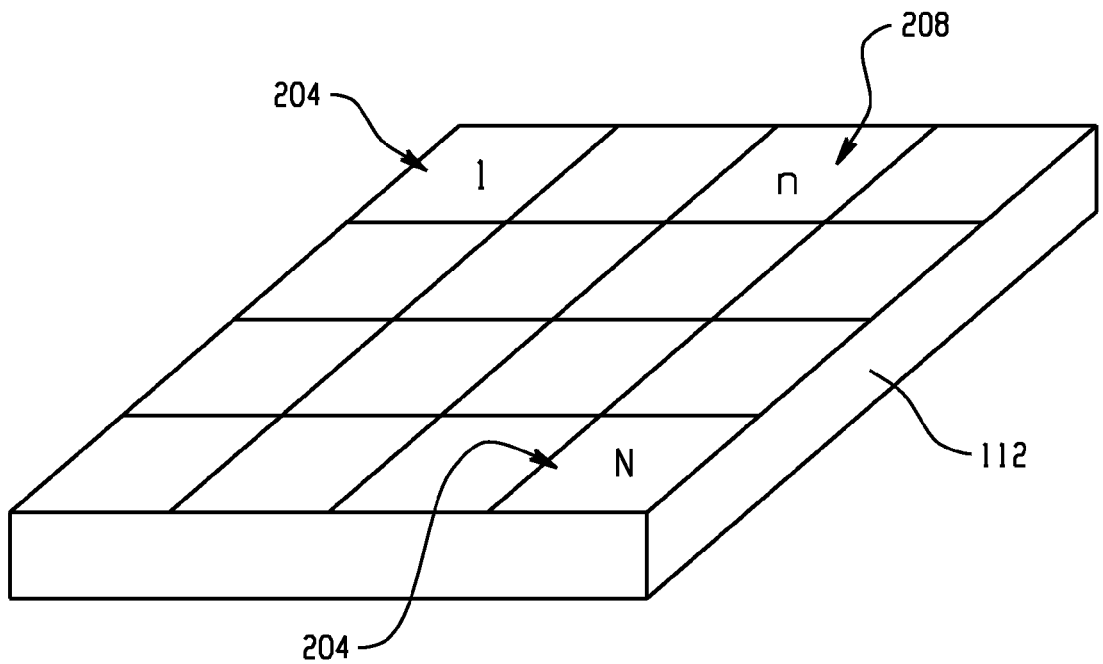
FIG. 2 illustrates an exemplary detector that can be used with the medical imaging system.

FIG. 2 illustrates an exemplary depiction of one of the detectors 112. As shown, the detector 112 can include N sub-detectors (or pixels) 204, wherein N is an integer. At least one of the N sub-detectors, e.g., an nth sub-detector 208, wherein $1 \leq n \leq N$, includes $T_n$ thresholds, wherein n and T are integers, for counting photons and measuring photon energy.

At least one of these $T_n$ thresholds can be set to count substantially all incident photons, while at least another of the $T_n$ thresholds can be set to a different energy level, and each of the N sub-detectors 204 may include similar and/or different thresholds. The nth sub-detector 208 counts $y_{n,t}$ photons above threshold number t, wherein $1 \leq t \leq T_n$, and t is an integer. The detector 112 has a finite energy resolution, $\sigma_E$, which can be ascertained from energy measurements using the detector 112, theoretical or mathematical computations, or the like. It is to be appreciated that the detector 112 can include CZT or other detection material.

The data captured by the N sub-detectors 204 is processed by the binning component 132 and reconstructed by the reconstruction component 136 (as described above). The reconstruction component 136 can employ various algorithms including the Maximum Likelihood (ML) reconstruction algorithm 140 to reconstruct the spectral data. The following provides one such approach for the counts captured by the N sub-detectors and the finite energy resolution detector 112.

An exemplary likelihood function L for the detected spectral data is provided below in Equation 1:

$$\prod_{n=1}^{N} \prod_{t=1}^{T_n} P \begin{pmatrix} x_{t,n} \mid \alpha_{h,M_{t-1}} \eta_{M_{t-1}} + \\ \alpha_{l,M_{t+1}} \eta_{M_{t+1}} - \\ (\alpha_{l,M_t} + \alpha_{h,M_t}) \eta_{M_t} + \\ \sum_{m=M_t}^{M_{t+1}-1} \eta_m \end{pmatrix} \quad (1)$$

wherein N represents the number of sub-detectors, n represents the nth sub-detector 208, t represents one of the $T_n$ thresholds of the nth sub-detector 208, $M_t$ represents the lowest bin number above threshold t with $M_{T_n+1}=M$, $\alpha_{h;m}$ represents the fraction of photons of bin m that migrate to the next higher bin, $\alpha_{l;m}$ represents the fraction of photons of bin m that migrate to the next lower bin, $\eta_m$ represents the number of photons in bin number $M_t$, and $x_{t,n}$ represents the number of photons that is counted between the thresholds t and t+1. For an initial and last bin of the energy distribution, migration is $\alpha_{l;1}=0$ and $\alpha_{h;M}=0$, respectively.

An exemplary log-likelihood function log(L) is provided below in Equation 2:

$$-N \sum_{j=1}^{M} \eta_m + \sum_{n=1}^{N} \sum_{t=1}^{T_n} \left( \frac{\alpha_{h,M_{t-1}} \eta_{M_{t-1}} + \alpha_{l,t+1} \eta_{t+1} -}{(\alpha_{l,M_t} + \alpha_{h,M_t}) \eta_{M_t}} \right) + \quad (2)$$

$$\sum_{n=1}^{N} \sum_{t=1}^{T_n} x_{t,n} \log \left( \frac{\alpha_{h,M_{t-1}} \eta_{M_{t-1}} + \alpha_{l,M_{t+1}} \eta_{M_{t+1}} -}{(\alpha_{l,M_t} + \alpha_{h,M_t}) \eta_{M_t} + \sum_{m=M_t}^{M_{t+1}-1} \eta_m} \right).$$

A maximization of the log-likelihood log(L) in equation 2 can be determined from the gradient and the diagonal of the Hessian. An exemplary gradient $$\frac{\partial L}{\partial \eta_k}$$

is provided below in equation 3:

$$-N \sum_{n=1}^{N} \sum_{t=1}^{T_n} (\varepsilon^{k,M_{t-1}} \alpha_{h,M_{t-1}} + \varepsilon^{k,M_{t+1}} \alpha_{l,M_{t+1}} - \varepsilon^{k,M} (\alpha_{l,M_t} + \alpha_{h,M_t})) + \quad (3)$$

$$\sum_{n=1}^{N} \sum_{t=1}^{T_n} \frac{\left( \begin{array}{c} \varepsilon^{k,M_{t-1}} \alpha_{h,M_{t-1}} + \varepsilon^{k,M_{t+1}} \alpha_{l,M_{t+1}} - \\ \varepsilon^{k,M} (1 - \alpha_{l,M_t} - \alpha_{h,M_t}) \end{array} \right) x_{t,n}}{\alpha_{h,M_{t-1}} \eta_{M_{t-1}} + \alpha_{l,M_{t+1}} \eta_{M_{t+1}} - (\alpha_{l,M_t} + \alpha_{h,M_t}) \eta_{M_t} + \sum_{m=M_t}^{M_{t+1}-1} \eta_m},$$

and an exemplary diagonal of the Hessian is provided below in Equation 4:

$$\frac{\partial^2 L}{\partial^2 \eta_k} = -\sum_{n=1}^{N} \sum_{t=1}^{T_n} \frac{\left( \begin{array}{c} \varepsilon^{k,M_{t-1}} \alpha_{h,M_{t-1}} + \varepsilon^{k,M_{t+1}} \alpha_{l,M_{t+1}} - \\ \varepsilon^{k,M} (1 - \alpha_{l,M_t} - \alpha_{h,M_t}) \end{array} \right)^2 x_{t,n}}{\alpha_{h,M_{t-1}} \eta_{M_{t-1}} + \alpha_{l,M_{t+1}} \eta_{M_{t+1}} - (\alpha_{l,M_t} + \alpha_{h,M_t}) \eta_{M_t} + \sum_{m=M_t}^{M_{t+1}-1} \eta_m)^2}, \quad (4)$$

where $$\varepsilon^{ij} = \begin{cases} 1, i=j \\ 0, i \neq j \end{cases}.$$

The above describes an exemplary algorithm for reconstructing data detected with finite energy resolution detectors 112, each having N thresholds. It is to be appreciated that perfect resolution detectors are also contemplated herein. An exemplary algorithm for reconstructing data detected with perfect energy resolution detectors is described in PCT2006/051068 filed on Apr. 7, 2006 and EP05102971.8 filed on Apr. 14, 2006, both of which are incorporated herein by reference.

Figure 3:
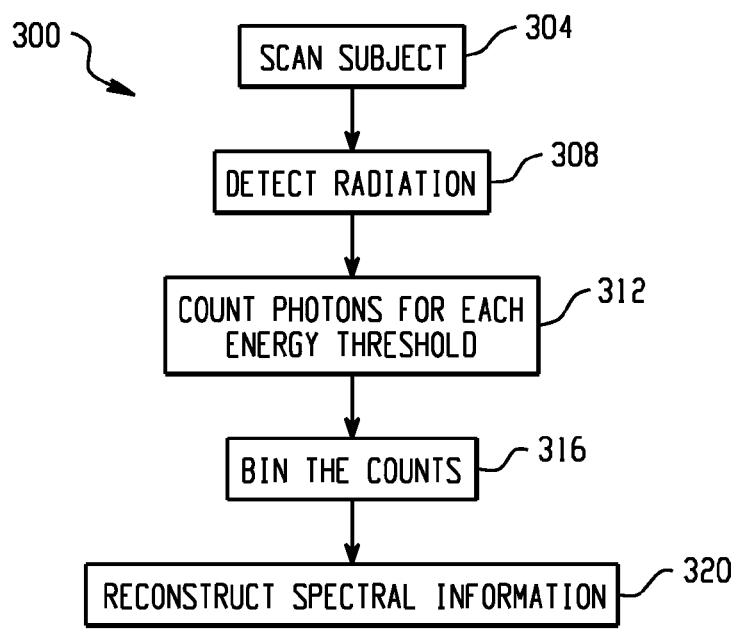
FIG. 3 illustrates an exemplary method for employing an energy spectrum reconstruction to generate one or more images in connection with a medical imaging system.

FIG. 3 illustrates a non-limiting method 300 for reconstructing data captured with the imaging system 100. In this example, data is captured by one or more of the sub-detectors 204 of the one or more of the detectors 112, for example, via counting incident photons with energy levels above and/or below one or more energy thresholds. As described above, each of the detectors 112 can include N sub-detectors 204, each with one or more similar or different energy thresholds. At reference numeral 304, a subject is suitably moved by the support 124 within the imaging region 116 and scanned with the system 100. At 308, radiation passing through the imaging region 116 (and the subject) strikes one or more of the sub-detectors 204 of a detector 112. At 312, each of these sub-detector(s) 204 counts the number of incident photons above and/or below each of its energy thresholds. At 316, the photon counts and energy information is provided to the binning component 132, which separates the information into one or more energy bins. This can be done via various methods such as subtracting count information as described above. The data is then provided to the reconstruction component 136, which processes the data using statistical methods such as the Maximum Likelihood algorithm 140. The reconstructed data can be used to generate one or more images, which can be viewed, stored, and/or farther processed.

Exemplary applications in which the systems and methods described herein can be employed include, but are not limited to, baggage inspection, medical applications, animal imaging, heart scanning, material testing, non-destructive imaging, machine vision, and material science.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

Having thus described the preferred embodiments, the invention is now claimed to be:

1. A computed tomography system, comprising:
   an x-ray source that rotates about and emits radiation through an imaging region;
   at least one finite energy resolution detector that detects the emitted radiation, wherein the at least one finite energy resolution detector includes a plurality of sub-detectors, wherein each sub-detector is associated with one or more different energy thresholds and each energy threshold is used to count a number of incident photons corresponding to an energy range; and
   a reconstruction system that reconstructs the photon counts to generate one or more images of a subject residing within the imaging region utilizing a maximum likelihood estimation that takes into account a finite energy resolution of the detector, wherein for a given energy bin, the estimation takes into account both photons corresponding to the energy bin and photons corresponding to another energy bin that are also assigned to the energy bin.

2. The system of claim 1, wherein at least one of the plurality of sub-detectors includes Cadmium Zinc Telluride material.

3. The system of claim 1, further including a binning component that receives the photon counts from the sub-detector and bins the counts into one or more different energy bins having different energy ranges.

4. The system of claim 3, wherein the binning component subtracts the counts associated with two different energy thresholds to determine the counts for one of the one or more bins having an energy range between the two different energy thresholds.

5. The system of claim 1, wherein the reconstruction system uses a numerical method to reconstruct the photon count energy distribution.

6. The system of claim 1, wherein the reconstruction system performs an estimate on the photon energy distribution to reconstruct the photon energy distribution.

7. The system of claim 6, wherein a likelihood estimate of the photon energy distribution is a function of the following:

$$\prod_{n=1}^{N} \prod_{t=1}^{T_n} P \left( \begin{array}{c} \alpha_{h,M_{t-1}} \eta_{M_{t-1}} + \\ \alpha_{l,M_{t+1}} \eta_{M_{t+1}} - (\alpha_{l,M_t} + \alpha_{h,M_t}) \eta_{M_t} + \\ \sum_{m=M_t}^{M_{t+1}-1} \eta_m \mid \chi_{t,n} \end{array} \right) \quad (1)$$

wherein N represents a number of sub-detectors, n represents an nth sub-detector, t represents one of $T_n$ thresholds of the nth sub-detector, $M_t$ represents a lowest bin number above threshold t with $M_{Tn+1}=M$, $\alpha_{h;m}$ represents a fraction of photons of a bin m that migrate to a next higher bin, $\alpha_{l;m}$ represents a fraction of photons of the bin m that migrate to a next lower bin, $\eta_m$ represents a number of photons in bin number $M_t$, and $x_{t;n}$ represents a number of photons counted between the thresholds t and t+1.

8. The system of claim 6, wherein a log-likelihood estimate of the photon energy distribution is a function of the following:

$$-N \sum_{j=1}^{M} \eta_m + \sum_{n=1}^{N} \sum_{t=1}^{T_n} (\alpha_{h,M_{t-1}} \eta_{M_{t-1}} + \alpha_{l,t+1} \eta_{t+1} - (\alpha_{l,M_t} + \alpha_{h,M_t}) \eta_{M_t}) + \quad (2)$$

$$\sum_{n=1}^{N} \sum_{t=1}^{T_n} x_{t,n} \log \left( \begin{array}{c} \alpha_{h,M_{t-1}} \eta_{M_{t-1}} + \alpha_{l,M_{t+1}} \eta_{M_{t+1}} - \\ (\alpha_{l,M_t} + \alpha_{h,M_t}) \eta_{M_t} + \\ \sum_{m=M_t}^{M_{t+1}-1} \eta_m \end{array} \right).$$

wherein N represents a number of sub-detectors, n represents an nth sub-detector, t represents one of the $T_n$ thresholds of the nth sub-detector, $M_t$ represents a lowest bin number above threshold t with $M_{Tn+1}=M$, $\alpha_{h;m}$ represents a fraction of photons of bin m that migrate to a next higher bin, $\alpha_{l;m}$ represents a fraction of photons of bin m that migrate to a next lower bin, $\eta_m$ represents a number of photons in bin number $M_t$, and $x_{t;n}$ represents a number of photons that is counted between the thresholds t and t+1.

9. The system of claim 8, wherein the log-likelihood estimate is maximized using a gradient and a diagonal of a Hessian.

10. The system of claim 1, wherein the plurality of sub-detectors have different energy thresholds.

11. The system of claim 1, wherein at least one of the plurality of sub-detectors includes an energy threshold for counting substantially all incident photons.

12. The system of claim 1, wherein the system includes one of a medical and an industrial imaging scanner.

13. The system of claim 1, wherein each of the plurality of sub-detectors further counts a number of incident photons with energy below its one or more corresponding energy thresholds and the reconstruction system reconstructs a photon energy distribution including one of the photon counts above the thresholds, the photon counts below the thresholds, and a combination of the photon counts above and below the threshold to generate the one or more images.

14. A computed tomography (CT) reconstruction method comprising:
   detecting radiation traversing an imaging region;
   counting a number of incident photons for each of a plurality of different energy thresholds of a sub-detector of a finite resolution detector to generate an energy distribution of counts; and
   reconstructing an image utilizing the counts making up the energy distribution based on a maximum likelihood estimation that takes into account a finite energy resolution of the detector.

15. The method of claim 14, wherein the sub-detector includes Cadmium Zinc Telluride detection material.

16. The method of claim 14, further including binning the counts into one or more different energy bins having different energy ranges.

17. The method of claim 14, wherein the maximum likelihood estimation includes a maximization of a log-likelihood function.

18. The method of claim 14, wherein the method is programmed and executed by a at least one of a medical and an industrial imaging scanner.

19. A CT imaging system comprising:
   means for emitting radiation through an imaging region and detecting emitted radiation that traverses the imaging region;

means for counting a number of incident photons for each of a plurality of different energy ranges of a finite energy resolution sub-detector; and means for spectrally reconstructing the counts to generate one or more images in which an estimation for a given energy bin takes into account photons corresponding to the energy bin and a fraction of photons corresponding to another energy bin that are also assigned to the energy bin.

* * * * *